US012207368B2

(12) United States Patent
Cheng et al.

(10) Patent No.: US 12,207,368 B2
(45) Date of Patent: Jan. 21, 2025

(54) LED COLOR AND BRIGHTNESS CONTROL APPARATUS AND METHOD

(71) Applicant: Diodes Incorporated, Plano, TX (US)

(72) Inventors: Dongjie Cheng, Murphy, TX (US); Vijay Hugar, Hubballi (IN); Sumit Bhat, Hubballi (IN); Joy Das, Shyamnagar (IN)

(73) Assignee: Diodes Incorporated, Plano, TX (US)

( * ) Notice: Subject to any disclaimer, the term of this patent is extended or adjusted under 35 U.S.C. 154(b) by 329 days.

(21) Appl. No.: 17/663,707

(22) Filed: May 17, 2022

(65) Prior Publication Data

US 2023/0422373 A1 Dec. 28, 2023

(51) Int. Cl.

| | |
|---|---|
| ***H05B 45/44*** | (2020.01) |
| ***H05B 45/10*** | (2020.01) |
| ***H05B 45/20*** | (2020.01) |
| ***H05B 45/325*** | (2020.01) |
| ***H05B 45/397*** | (2020.01) |

(52) U.S. Cl.

CPC ............. *H05B 45/44* (2020.01); *H05B 45/10* (2020.01); *H05B 45/20* (2020.01); *H05B 45/325* (2020.01); *H05B 45/397* (2020.01)

(58) Field of Classification Search

CPC ...... H05B 45/10; H05B 45/20; H05B 45/325; H05B 45/395; H05B 45/397; H05B 45/44; H05B 45/345; H05B 45/46

See application file for complete search history.

(56) References Cited

U.S. PATENT DOCUMENTS

| | | | | |
|---|---|---|---|---|
| 6,095,661 | A * | 8/2000 | Lebens | H05B 45/12 362/159 |
| 10,554,204 | B1 * | 2/2020 | Young | H03K 7/08 |
| 2001/0028227 | A1 * | 10/2001 | Lys | G09G 3/32 315/368.23 |
| 2008/0012508 | A1 * | 1/2008 | Steele | H05B 45/20 315/306 |
| 2011/0204778 | A1 * | 8/2011 | Sadwick | H05B 45/22 315/294 |
| 2012/0068619 | A1 * | 3/2012 | Sung | H05B 45/3725 315/291 |
| 2014/0128941 | A1 * | 5/2014 | Williams | H05B 45/00 315/193 |

(Continued)

FOREIGN PATENT DOCUMENTS

CN 106879125 A 6/2017

*Primary Examiner* — Renan Luque

(74) *Attorney, Agent, or Firm* — Li Li; AP3 Law Firm PLLC

(57) ABSTRACT

An apparatus includes a bandgap voltage reference configured to generate a current reference for controlling a plurality of light emitting diode channels, a plurality of MOSFET devices connected in parallel and coupled between a cathode of a light emitting diode channel and ground, wherein the plurality of MOSFET devices is configured to control a current flowing through the light emitting diode channel, and a control circuit configured to generate gate drive signals for the plurality of MOSFET devices, wherein the gate drive signals are configured to adjust the current flowing through the light emitting diode channel based on a predetermined color and a predetermined brightness level of the light emitting diode channel.

22 Claims, 5 Drawing Sheets

(56) References Cited

U.S. PATENT DOCUMENTS

| | | | | |
|---|---|---|---|---|
| 2014/0197752 | A1* | 7/2014 | Pantano ................ | H05B 45/46 315/193 |
| 2019/0320515 | A1* | 10/2019 | Sadwick ................ | H05B 45/00 |
| 2020/0389961 | A1* | 12/2020 | Nishigami ............. | H05B 45/46 |
| 2021/0256931 | A1 | 8/2021 | Davis et al. | |
| 2022/0198995 | A1* | 6/2022 | Ahmed ............... | H01L 29/7869 |

* cited by examiner

LED COLOR AND BRIGHTNESS CONTROL APPARATUS AND METHOD

TECHNICAL FIELD

Embodiments of the invention are related to a light-emitting diode color and brightness control apparatus and method, and more particularly, to an RGB based LED system.

BACKGROUND

A light-emitting diode (LED) is a semiconductor light source. When a voltage is applied to the LED, a current flows through the LED. In response to the current flowing through the LED, electrons and holes recombine in the PN Junction of the diode. In the recombination process, energy is released in the form of photons. The photons with different wavelengths and/or frequencies produce different colors of light. The primary LED colors are red, green and blue (RGB). Mixing these colors in different proportions can make almost all the colors of visible light.

To produce a different color, three RGB colors in different intensities are combined. The intensity of light produced by an LED is proportional to the current flowing through the LED. The current flowing through the LED can be adjusted to change the intensity of the LED, thereby achieving a different color through changing the intensities of the RGB colors.

An RGB based LED system plays a critical role in lighting technologies, which are widely used in fields such as automotive/industrial/architectural lighting, smart home appliances, wearable and handheld devices and the like. An RGB based LED system may comprise a plurality of RGB modules (e.g., 12 RGB modules). Each RGB module contains three light-emitting diodes, namely a red LED, a green LED and a blue LED. In most lighting applications, lights emitted from one RGB module are perceived by human eyes as a single point light source because of proximity of the three light-emitting diodes within one RGB module.

The three RGB colors of one RGB module are mixed into a single color and a single brightness level. The color and the brightness level of the RGB module can be changed through adjusting the currents flowing through the three light-emitting diodes in the RGB module. A variety of colors can be created by mixing the three RGB colors in different light emission intensity ratios of red, green and blue. The brightness level of an RGB module is the total emission intensity from the three light emitting diodes combined. The brightness level of a channel (a light-emitting diode) is proportional to the average current flowing through the LED channel.

The control process of an LED average current or emission intensity is often termed as dimming. The dimming process can be divided into two categories: analog dimming and PWM (pulse-width modulation) dimming. In the conventional RGB control methods, two complex control schemes are employed to control the color and the brightness level of the RGB based LED system. In a first RGB control method, a brightness PWM control scheme is applied to all RGB modules. In other words, the brightness and color of each RGB module are controlled separately. This is a partition control scheme. In a second RGB control method, a single functional control bit is used to control the color and the brightness level of a corresponding RGB module. This is a bundling control scheme. Either the partition control scheme or the bundling control scheme causes a complex and expensive system. Such a complex and expensive system has many shortcomings such as lack of design flexibility, poor reliability and the like. It would be desirable to have a simple control apparatus and method to effectively control the color and brightness level of an RGB based LED system.

SUMMARY

These and other problems are generally solved or circumvented, and technical advantages are generally achieved, by preferred embodiments of the present disclosure which provide a light emitting diode (LED) color and brightness control apparatus and method.

In accordance with an embodiment, an apparatus comprises a bandgap voltage reference configured to generate a current reference for controlling a plurality of light emitting diode channels, a plurality of MOSFET devices connected in parallel and coupled between a cathode of a light emitting diode channel and ground, wherein the plurality of MOSFET devices is configured to control a current flowing through the light emitting diode channel, and a control circuit configured to generate gate drive signals for the plurality of MOSFET devices, wherein the gate drive signals are configured to adjust the current flowing through the light emitting diode channel based on a predetermined color and a predetermined brightness level of the light emitting diode channel.

In accordance with another embodiment, a method for controlling brightness and color of a group of red, green and blue light emitting diode channels comprises in a lighting module comprising a red light emitting diode channel, a green light emitting diode channel and a blue light emitting diode channel, based on a predetermined color, determining three color digital values and saving the three color digital values in three corresponding color registers, based on a predetermined brightness level, determining a brightness digital value and saving the brightness digital value in a brightness register, and multiplying the three color digital values with the brightness digital value to achieve three PWM signals to control currents flowing through the red light emitting diode channel, the green light emitting diode channel and the blue light emitting diode channel, respectively.

In accordance with yet another embodiment, a system comprises a plurality of lighting modules, each of which comprises a red light emitting diode channel, a green light emitting diode channel and a blue light emitting diode channel, and a light emitting diode control apparatus comprising a bandgap voltage reference configured to generate a current reference for controlling the plurality of lighting modules, a plurality of MOSFET devices connected in parallel and coupled between a cathode of one light emitting diode channel and ground, wherein the plurality of MOSFET devices is configured to control a current flowing through the light emitting diode channel, and a control circuit configured to generate gate drive signals for the plurality of MOSFET devices, wherein the gate drive signals are configured to adjust the current flowing through the light emitting diode channel based on a predetermined color and a predetermined brightness level of the light emitting diode channel.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely an RGB based LED system. The disclosure may also be applied, however, to a variety of LED systems. Hereinafter, various embodiments will be explained in detail with reference to the accompanying drawings.

Figure 1:
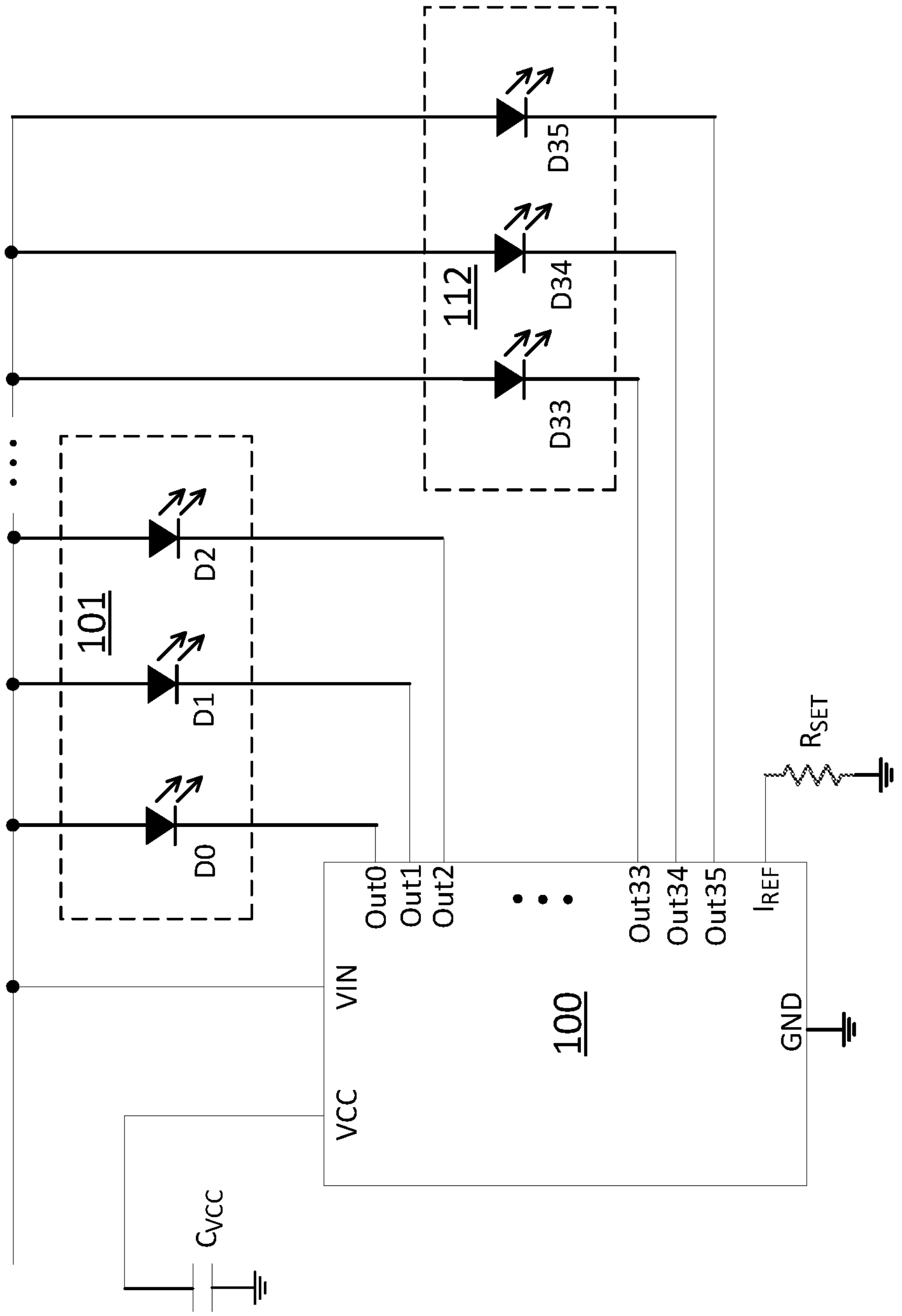
FIG. 1 illustrates a block diagram of a control apparatus for a light emitting diode system in accordance with various embodiments of the present disclosure.

FIG. 1 illustrates a block diagram of a control apparatus for a light emitting diode system in accordance with various embodiments of the present disclosure. The light emitting diode system comprises a plurality of lighting modules (e.g., lighting modules 101 and 112). Each lighting module comprises a red light emitting diode channel, a green light emitting diode channel and a blue light emitting diode channel. In some embodiments, there may be 12 lighting modules in the light-emitting diode system.

As shown in FIG. 1, a first lighting module 101 comprises three channels. Each channel comprises a light emitting diode. In some embodiments, D0 is a red light emitting diode. D1 is a green light emitting diode. D2 is a blue light emitting diode. The first lighting module 101 is a first RGB module. A second lighting module 112 comprises three channels. Each channel comprises a light emitting diode. In some embodiments, D33 is a red light emitting diode. D34 is a green light emitting diode. D35 is a blue light emitting diode. The second lighting module 112 is a second RGB module.

It should be noted that FIG. 1 illustrates only two lighting modules of a light-emitting diode system that may include hundreds of such lighting modules. The number of lighting modules illustrated herein is limited solely for the purpose of clearly illustrating the inventive aspects of the various embodiments. The present disclosure is not limited to any specific number of lighting modules.

The control apparatus 100 is a mix-signal RGB controller combining analog dimming and PWM dimming for controlling an array of RGB modules (e.g., lighting modules 101 and 112). The generation of the color of a lighting module is achieved by setting the color control register of each channel of the lighting module. The generation of the brightness of the lighting module is achieved by setting the brightness control register of this lighting module. The output of the control apparatus 100 is configured to generate a PWM signal for each channel. In some embodiments, the PWM signal has a 12-bit PWM resolution and operates at a 30-kHz ultrasound frequency. The high PWM resolution such as a 12-bit PWM resolution, helps the RGB controller to achieve a smooth dimming effect. Selecting an ultrasound operating frequency prevents the RGB controller from producing audible noise.

In operation, the control apparatus 100 is configured to control the currents flowing through the respective light emitting diodes shown in FIG. 1. Through controlling the currents flowing through three channels in a lighting module, the color and brightness of the lighting module can be adjusted accordingly.

As shown in FIG. 1, the control apparatus 100 comprises a plurality of output terminals from Out0, Out1 and Out2 to Out33, Out34 and Out35. Each output terminal (e.g., Out0) is connected between a corresponding light emitting diode (e.g., D0) and ground (not shown but illustrated in FIG. 3). Inside the control apparatus 100, a plurality of function units is connected to the output terminal (e.g., Out0). The plurality of function units is configured such that the currents flowing through the channels (light emitting diodes) of a lighting module (e.g., lighting module 101) are determined based on the color and brightness settings for this lighting module.

In some embodiments, the plurality of function units connected to the output terminal comprises a bandgap voltage reference, a plurality of MOSFET devices and a control circuit. The bandgap voltage reference is configured to generate a current reference for controlling a plurality of channels of the light emitting diode system. The plurality of MOSFET devices is connected in parallel and, through M1 in FIG. 3, coupled between a cathode of a light emitting diode and ground. The plurality of MOSFET devices is configured to control a current flowing through the light emitting diode. The control circuit is configured to generate gate drive signals for the plurality of MOSFET devices. The gate drive signals are configured to achieve a predetermined color and a predetermined brightness level. The detailed schematic diagram of the plurality of function units will be discussed below with respect to FIG. 3.

FIG. 1 further illustrates a set resistor $R_{SET}$ connected between an $I_{REF}$ terminal and ground. The set resistor $R_{SET}$ is employed to set the maximum current flowing through the light emitting diodes shown in FIG. 1. A capacitor $C_{VCC}$ is connected between a VCC terminal and ground. The capacitor $C_{VCC}$ is used to keep the voltage at VCC terminal constant and steady.

In operation, a lighting module (e.g., lighting module 101) comprises a red light emitting diode channel (e.g., D0), a green light emitting diode channel (e.g., D1) and a blue light emitting diode channel (e.g., D2). Based on a predetermined color, the control apparatus 100 determines three digital values for setting the color of the lighting module. The three digital values are stored in three corresponding color registers. Then, based on a predetermined brightness level, the control apparatus 100 determines a brightness digital value and saves the brightness digital value in a brightness register. Furthermore, the control apparatus 100 multiplies the three digital values for setting the color with the brightness digital value to achieve three PWM signals. These three PWM signals are used to control the currents flowing through the red light emitting diode channel, the green light emitting diode channel and the blue light emitting diode channel, respectively.

Figure 2:
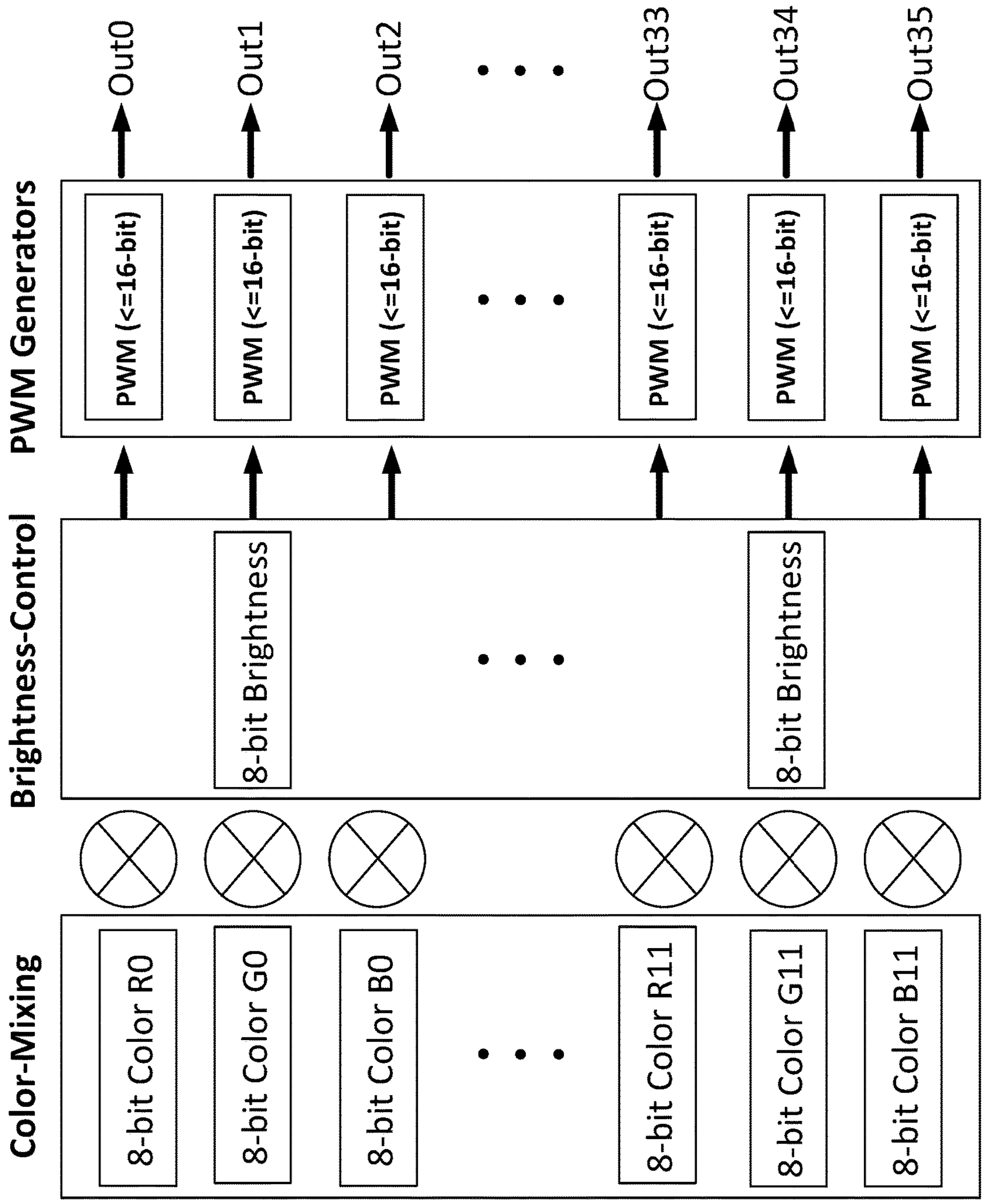
FIG. 2 illustrates a plurality of PWM generators for controlling the light emitting diodes shown in FIG. 1 in accordance with various embodiments of the present disclosure.

FIG. 2 illustrates a plurality of PWM generators for controlling the light emitting diodes shown in FIG. 1 in accordance with various embodiments of the present disclosure. The current flowing through each light emitting diode is controlled by a PWM signal. In some embodiments, the PWM signal is an exemplary 12-bit resolution PWM signal generated by a PWM generator.

As shown in FIG. 2, a color-mixing unit is configured to generate a plurality of color control signals according to the color setting of the respective light emitting diodes. In some embodiments, each color control signal is an 8-bit color control signal. This 8-bit color control signal is saved in a corresponding color register.

As shown in FIG. 2, an 8-bit color control signal R0 is used to determine the current flowing through a red light emitting diode in a first lighting module. An 8-bit color control signal G0 is used to determine the current flowing through a green light emitting diode in the first lighting module. An 8-bit color control signal BO is used to determine the current flowing through a blue light emitting diode in the first lighting module. Through configuring these three color control signals, the color of the first lighting module can be determined accordingly. Likewise, an 8-bit color control signal R11 is used to determine the current flowing through a red light emitting diode in a twelfth lighting module. An 8-bit color control signal G11 is used to determine the current flowing through a green light emitting diode in the twelfth lighting module. An 8-bit color control signal B11 is used to determine the current flowing through a blue light emitting diode in the twelfth lighting module. Through configuring these three color control signals, the color of the twelfth lighting unit can be determined accordingly.

A brightness control unit is configured to generate a plurality of brightness control signals according to the brightness setting of the respective lighting modules. In some embodiments, each brightness control signal is an 8-bit brightness control signal. This 8-bit brightness control signal is saved in a corresponding brightness register.

As shown in FIG. 2, the color control signals of a lighting module are multiplied by a corresponding brightness control signal to generate the PWM signals for the lighting module. For example, the 8-bit color control signal R0 is multiplied by the 8-bit brightness control signal of the first lighting module. The product of this multiplication is a 16-bit signal. The four least significant bits of this product are omitted depending on design needs. As a result, a 12-bit PWM signal is generated for the red light emitting diode of the first lighting module. In an embodiment shown in FIG. 3, MG3 may contain six exemplary MOSFET devices controlled by a 6-bit global analog dimming control signal. The gate of each MOSFET device is configured to receive a 12-bit resolution PWM signal from a PWM Generator 304 shown in FIG. 3.

Figure 3:
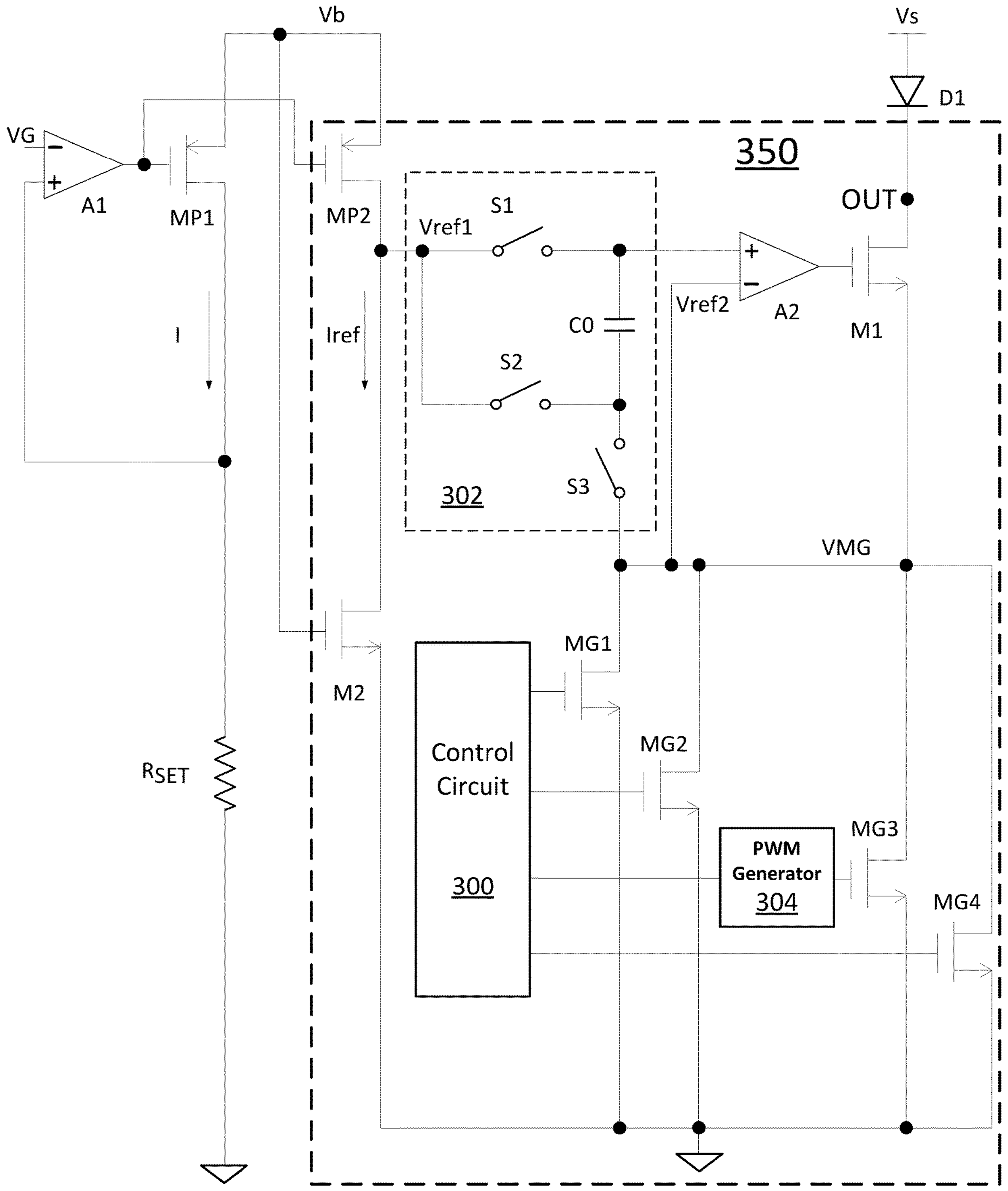
FIG. 3 illustrates a schematic diagram of the control apparatus shown in FIG. 1 in accordance with various embodiments of the present disclosure.

FIG. 3 illustrates a schematic diagram of the control apparatus shown in FIG. 1 in accordance with various embodiments of the present disclosure. As shown in FIG. 3, an anode of a light emitting diode D1 is connected to a power supply Vs. A cathode of the light emitting diode D1 is connected to an OUT node. The light emitting diode D1 may be any light emitting diode shown in FIG. 1. The OUT node is connected to the corresponding output terminal shown in FIG. 1.

The control apparatus comprises a bandgap voltage reference VG, a first amplifier A1, a current mirror formed by MP1 and MP2, a set resistor $R_{SET}$, an auxiliary transistor M2, a sample and hold circuit 302 formed by switches S1, S2, S3 and capacitor C0, a control circuit 300, a second amplifier A2, a transistor M1 and a plurality of MOSFET device groups MG1, MG2, MG3 and MG4.

In operation, the bandgap voltage reference VG is configured to generate a current reference for controlling a plurality of light emitting diode channels (e.g., D1 shown in FIG. 3). In some embodiments, the bandgap voltage reference is equal to 700 mV. The bandgap voltage reference is shared by all channels shown in FIG. 3. One advantageous feature of having one single bandgap voltage reference for all light emitting diode channels is that the single bandgap voltage reference helps to improve channel-to-channel accuracy. In some embodiments, the channel-to-channel accuracy can be controlled within 2%. It should be noted that this high channel-to-channel accuracy is achieved without using common trimming options such as fuse trimming.

The plurality of MOSFET device groups MG1, MG2, MG3 and MG4 is connected in parallel and, through M1 in FIG. 3, coupled between a cathode of the light emitting diode D1 and ground. The plurality of MOSFET device groups MG1, MG2, MG3 and MG4 is configured to control a current flowing through the light emitting diode D1. The control circuit 300 is configured to generate gate drive signals for the plurality of MOSFET device groups MG1, MG2, MG3 and MG4. The gate drive signals are configured to adjust the current flowing through the light emitting diode D1 based on a predetermined color and a predetermined brightness level of the light emitting diode D1.

As shown in FIG. 3, the inputs of the current mirror MP1/MP2 are coupled to the bandgap voltage reference VG through the first operation amplifier A1. The set resistor $R_{SET}$ is coupled to the current mirror. As shown in FIG. 3, the current mirror comprises a first current mirror transistor MP1 and a second current mirror transistor MP2. The gates of MP1 and MP2 are connected together and further connected to an output of the first operation amplifier A1. An inverting input of the first operation amplifier A1 is connected to the bandgap voltage reference VG. A non-inverting input of the first operation amplifier A1 is connected to a common node of the set resistor $R_{SET}$ and the first current mirror transistor MP1.

As shown in FIG. 3, the first current mirror transistor MP1 and the set resistor $R_{SET}$ are connected in series between a bias voltage Vb and ground. A current-to-voltage conversion device is coupled to an output of the current mirror. In some embodiments, the current-to-voltage conversion device is implemented as an auxiliary transistor M2 operating in a triode region. In other words, the auxiliary transistor M2 functions as a resistor. As shown in FIG. 3, the auxiliary transistor M2 is connected in series with the second current mirror transistor MP2 between the bias voltage Vb and ground. The gate of the auxiliary transistor M2 is connected to the bias voltage Vb. It should be noted that Vb is a logic High voltage. Vb is also connected to the gates of those devices in MG1, MG2, MG3 and MG4.

As shown in FIG. 3, the second operation amplifier A2 is coupled between the output of the current mirror (the drain of MP2) and a gate of the transistor M1. A non-inverting input of the second operation amplifier A2 is connected to a common node of the auxiliary transistor M2 and the second current mirror transistor MP2 through the sample and hold circuit 302. An inverting input of the second operation amplifier A2 is connected to a source of the transistor M1. An output of the second operation amplifier A2 is connected to the gate of the transistor M1.

The plurality of MOSFET device groups comprises a first MOSFET device group MG1, a second MOSFET device group MG2, a third MOSFET device group MG3 and a fourth MOSFET device group MG4 connected in parallel between the source of the transistor M1 and ground.

The sample and hold circuit 302 comprises a first switch S1, a second switch S2, a third switch S3 and a capacitor C0. The first switch S1 is connected between the common node of the auxiliary transistor M2 and the second current mirror transistor MP2, and the non-inverting input of the second operation amplifier A2. The second switch S2 and the third switch S3 are connected in series between the common node of the auxiliary transistor M2 and the second current mirror transistor MP2, and the inverting input of the second operation amplifier A2. The capacitor C0 is connected between the non-inverting input of the second operation amplifier A2 and a common node of the second switch S2 and the third switch S3. The sample and hold circuit 302 and the second operation amplifier A2 form an auto-zero amplifier.

In some embodiments, when the PWM signal is of a 100% duty cycle, the auto-zero function can be achieved through a duty cycle compensation method. For example, the desired duty cycle is 100%. The PWM signal may be of a 97% duty cycle, and the rest (3%) is used to achieve the auto-zero function provided by the sample and hold circuit 302. In order to compensate the loss caused by the duty cycle mismatch (3% duty cycle), a duty cycle compensation current may be used. This duty cycle compensation current may be implemented as a bleed current. This duty cycle compensation current is able to cover the loss caused by the duty cycle mismatch.

In FIG. 3, MG3 is the primary channel current regulator controlling about 97% of the channel current. MG1, MG2 and MG4 are auxiliary channel current regulators controlling about 3% of the channel current. MG1 is configured to provide a bleed current. MG1 contains 24 exemplary devices (e.g., MOSFET devices) for 24-bit programming. The gate of each device is configured to receive a DC voltage equal to either 0 V or Vb. MG2 is configured to provide a delay compensation current. MG2 contains six exemplary devices (e.g., MOSFET devices) for 6-bit programming. The gate of each device is configured to receive a DC voltage equal to either 0 V or Vb. MG3 is configured to provide 12-bit exemplary PWM dimming and 6-bit exemplary analog dimming simultaneously. MG3 contains six exemplary devices (e.g., MOSFET devices) for 6-bit analog dimming, and the gate of each device is configured to receive a 12-bit exemplary PWM signal from the PWM generator 304. MG4 is configured to provide current accuracy trimming. MG4 contains four exemplary devices (e.g., MOSFET devices) for 4-bit trimming, and the gate of each device is configured to receive a DC voltage equal to either 0 V or Vb.

It should be noted the gates of the MOSFET devices in MG1, MG2, MG3 and MG4 are tied to Vb when a logic high signal is applied these gates. In addition, the drains of the MOSFET devices in MG1, MG2, MG3 and MG4 are maintained at a voltage level equal to Vref2. Through the gate and drain voltage settings above, the current flowing through M1 can be accurately controlled.

In operation, during a PWM off phase in which the PWM signal applied to the gate of MG3 has a logic low state, the first switch S1 and the third switch S3 are turned on, and the second switch S2 is turned off. As a result, the offset voltage is stored in the capacitor C0. During a PWM on phase in which the PWM signal applied to the gate of MG3 has a logic high state (Vg is equal to Vb), the first switch S1 and the third switch S3 are turned off, and the second switch S2 is turned on. As a result, the voltage stored in the capacitor C0 is added into the non-inverting input of the second operation amplifier A2 to cancel the offset voltage.

In operation, a maximum current flowing through the transistor M1 is determined by the set resistor $R_{SET}$.

The current flowing through MP1 can be expressed by the following equation:

$$I=VG/R_{SET} \tag{1}$$

The ratio of the current mirror MP1/MP2 is 1:m. In other words, the current flowing through MP2 is m times greater than the current flowing through MP1. M2 functions as a resistor because M2 is configured to operate in a triode region. The resistance of M2 is denoted as Ron_M2.

The current flowing through MP2 can be expressed by the following equation:

$$I\text{ref}=m\times VG/R_{SET} \tag{2}$$

The voltage on the common node of MP2 and M2 is denoted as Vref1. In consideration with Equation (2), Vref1 can be expressed by the following equation:

$$Vref1 = m\times\left(\frac{VG}{R_{SET}}\right)\times \text{Ron\_M2} \tag{3}$$

According to the operating principle of the second amplifier A2, Vref2 is equal to Vref1. As shown in FIG. 3, there are four MOSFET device groups connected in parallel between Vref2 and ground. The on resistance of each MOSFET device in the four MOSFET device groups is inversely proportional to the channel width W. As such, the maximum current flowing through M1 can be expressed as:

$$I\text{max}=V\text{ref2}/R\text{on\_total} \tag{4}$$

In Equation (4), Ron_total is the total resistance of the four MOSFET device groups connected in parallel. In some embodiments, Ron_total is inversely proportional to an equivalent width W_total. The resistance (Ron_M2) of M2 is inversely proportional to the width (W-2) of M2.

It should be noted that W_total is an equivalent width in consideration with the widths of the devices in MG1, MG2, MG3 and MG4. Furthermore, the duty cycle of the devices in MG3 may be considered when calculating W_total. For example, the width of the devices in MG3 is W_MG3. When the duty cycle of the devices in MG3 is 50%, the corresponding width of the devices in MG3 is equal to 0.5×

W_MG3. Furthermore, there is a 6-bit analog dimming register that selects the equivalent width W_total from the six devices of MG3.

In consideration with Equation (3), Equation (4) can be expressed as:

$$\text{Imax} = m \times \left(\frac{VG}{R_{SET}}\right) \times \frac{\text{W\_total}}{\text{W\_2}} \tag{5}$$

In Equation (5), m, W_total and W_2 can be replaced by a general parameter K. The maximum current Imax can be simplified as:

$$\text{Imax} = K \times \left(\frac{VG}{R_{SET}}\right) \tag{6}$$

Equation (6) indicates the maximum current flowing through M1 is determined by $R_{SET}$ and the 6-bit analog dimming register controlling the equivalent width W_total of MG3. By selecting different values of $R_{SET}$, the maximum current flowing through M1 may vary accordingly. In some embodiments, Imax is equal to 70 mA.

As described above, LED emission (current) control can be categorized as a control scheme combining both analog dimming and PWM dimming for controlling a plurality of LED channels. Setting Imax by equation (6) is essentially an analog dimming process, which is achieved through setting global dimming control signals/registers of MOSFET device groups MG1, MG2, MG3 and MG4. In the analog dimming process, a plurality of predetermined MOSFET devices (e.g., MOSFET devices in MG3) are enabled, and the rest devices are disabled. When calculating W_total in equation (5), only those enabled MOSFET devices can contribute toward W_total. In the PWM dimming process, only MG3 is controlled by the PWM dimming signal generated by the PWM generator 304. It should be noted that in the PWM dimming process, only those enabled MOSFET devices in MG3 are subject to the PWM dimming control. As a result, the current flowing through M1 is regulated by applying the PWM dimming to Imax.

In operation, if the signal applied to the gate of M1 changes instantly from a low voltage (e.g., 0 V) to a high voltage potential (e.g., a supply voltage), there is a finite amount of time taken by the second amplifier A2 to charge the gate of M1 above the turn-on threshold voltage of M1. This transition leads to a significant amount of error. To avoid this error, a bleed current provided by MG1 is used to keep M1 always on to compensate this error. In some embodiments, this bleed current is adjustable.

As shown in FIG. 3, the first MOSFET device group MG1 is controlled by a first global dimming control signal having 24 control bits. Under the first global dimming control signal, the first MOSFET device group MG1 is configured to provide the bleed current for compensating a finite amount of time used for charging the gate of the transistor M1 from a low voltage potential (e.g., 0 V) to a high voltage potential (e.g., a supply voltage).

In operation, with the bleed current added, when the PWM signal changes from a low voltage (e.g., 0 V) to a high voltage potential (e.g., a supply voltage), the gate voltage of M1 needs to change to support the increased current. The increased current means the current is the sum of the bleed current and the maximum current set by Equation (6). Furthermore, when a MOSFET device group such as MG3 is turned on, the voltage on the node VMG falls down. In order to maintain Vref2 equal to Vref1, the second operation amplifier A2 has to increase the voltage on the gate of M1, thereby increasing the current flowing through M1. The increased current flowing through M1 charges VMG to a level equal to Vref1. Due to various parasitic capacitors coupled to VMG, there may be a delay error. To avoid this delay error, a small current is provided by MG2 to compensate this delay error. In particular, the second MOSFET device group MG2 is controlled by a second global dimming control signal having 6 exemplary control bits. Under the second global dimming control signal, the second MOSFET device group MG2 is configured to provide a delay compensation current for compensating the delay error.

In operation, the third MOSFET device group MG3 is controlled by a third global dimming control signal having 6 control bits. Under the third global dimming control signal, the third MOSFET device group MG3 is configured to provide a PWM current flowing through the transistor M1. More particularly, MOSFET devices in the third MOSFET device group MG3 are selectively enabled by the third global dimming control signal having 6 control bits. Under the third global dimming control signal, the enabled MOSFET devices in the third MOSFET device group MG3 are configured to provide the PWM current flowing through the transistor M1. The PWM current is generated based on a PWM signal generated by the PWM generator 304.

In operation, systematic errors due to factors such as layout mismatch between different channels may cause channel-to-channel inaccuracy. This channel-to-channel inaccuracy can be corrected by using a trimming option. Under this trimming option, currents can be added or removed from M1 to minimize the channel-to-channel inaccuracy. As shown in FIG. 3, the fourth MOSFET device group MG4 is controlled by a trimming control signal having 6 control bits. Under the trimming control signal, the fourth MOSFET device group MG4 is configured to adjust a current flowing through the transistor M1 so as to balance currents flowing through different channels. In some embodiments, the trimming control signal is input through a suitable digital interface such as I2C, Universal Asynchronous Receiver-Transmitter (UART) and the like, for adjusting the current flowing through the transistor M1.

One advantageous feature of having the control apparatus shown in FIG. 3 is that the voltage on the drain of M1 can be reduced. In some embodiments, the voltage on the drain of M1 is as low as 350 mV. Such a low voltage helps to reduce power dissipation in the control apparatus. Such an advantage of reducing power dissipation is achieved through the A2 op-amp loop, in which the VMG voltage is regulated at a precise low value, such as about 200 mV.

It should be noted that FIG. 3 is simplified such that only one of many LED channels is shown. In the light emitting diode system, the first amplifier A1, MP1 of the current mirror and the set resistor $R_{SET}$ are unique and shared by all LED channels. The circuit 350 in the dashed rectangle is employed to control the current flowing one channel. The detailed implementation of the light emitting diode system will be described below with respect to FIG. 4.

It should further be noted that the method of generating Vref1 is quite flexible. In some embodiments, the control apparatus may generate a single V ref1 for all channels. Alternatively, the control apparatus may generate a dedicated Vref1 for each channel (e.g., the system configuration shown in FIG. 4). This is a matter of tradeoff between design simplicity and matching accuracy. Furthermore, in some embodiments, three reference signals may be employed to control all channels. In particular, the control apparatus is configured to generate a first Vref1 shared by all red LED channels. The control apparatus is configured to generate a second Vref1 shared by all green LED channels. The control apparatus is configured to generate a third Vref1 shared by all blue LED channels.

Figure 4:
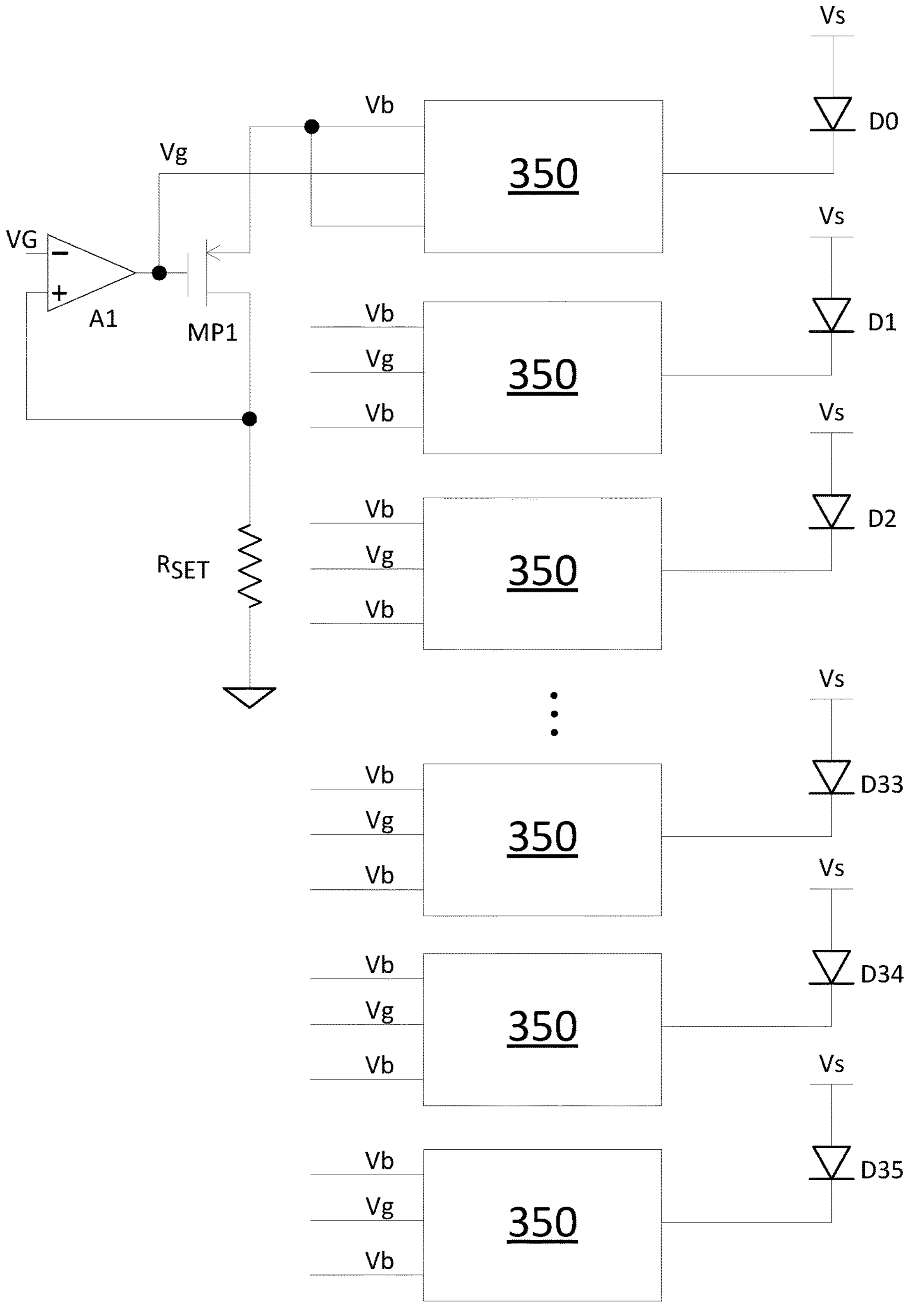
FIG. 4 illustrates a block diagram of the light emitting diode system shown in FIG. 1 in accordance with various embodiments of the present disclosure.

FIG. 4 illustrates a block diagram of the light emitting diode system shown in FIG. 1 in accordance with various embodiments of the present disclosure. The light emitting diode system includes 36 channels (D0-D35). Each circuit 350 shown in FIG. 4 is used to drive one channel. Each circuit 350 has three inputs connected to Vb, Vg and Vb, respectively. As shown in FIG. 4, the first amplifier A1, MP1 and $R_{SET}$ are shared by all 36 channels. Vb is a bias voltage. Vg is tapped from the gate of MP1.

It should be noted that FIG. 4 illustrates only 36 channels of a light-emitting diode system that may include hundreds of such channels. The number of channels illustrated herein is limited solely for the purpose of clearly illustrating the inventive aspects of the various embodiments. The present disclosure is not limited to any specific number of channels.

Figure 5:
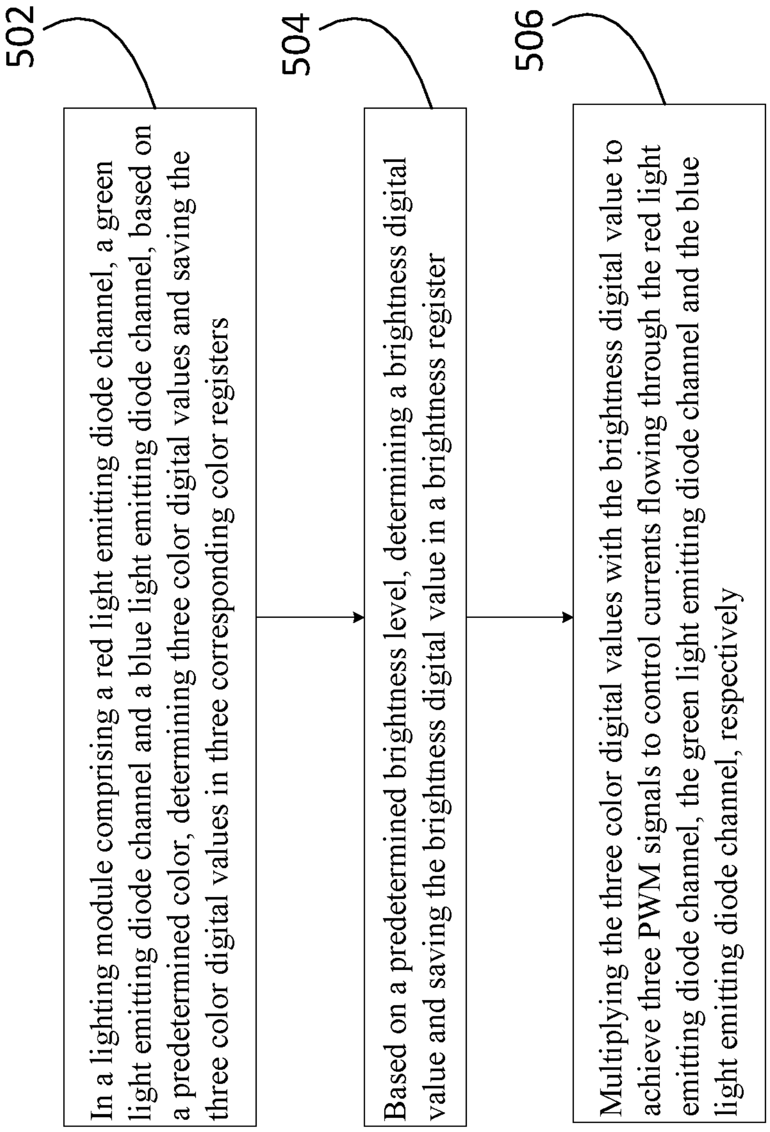
FIG. 5 illustrates a flow chart of controlling the light emitting diode system shown in FIG. 1 in accordance with various embodiments of the present disclosure.

FIG. 5 illustrates a flow chart of controlling the light emitting diode system shown in FIG. 1 in accordance with various embodiments of the present disclosure. This flowchart shown in FIG. 5 is merely an example, which should not unduly limit the scope of the claims. One of ordinary skill in the art would recognize many variations, alternatives, and modifications. For example, various steps illustrated in FIG. 5 may be added, removed, replaced, rearranged and repeated.

Referring back to FIGS. 1 and 3, a light emitting diode system comprises a plurality of lighting modules (e.g., lighting modules 101 and 112 shown in FIG. 1). Each lighting module comprises a red light emitting diode channel, a green light emitting diode channel and a blue light emitting diode channel. In some embodiments, there may be 12 lighting modules. Each module has three channels. The light emitting diode system includes 36 exemplary channels.

A light emitting diode control apparatus (e.g., control apparatus 100 shown in FIG. 1) is employed to control the color and brightness of the light emitting diode system. The light emitting diode control apparatus comprises a bandgap voltage reference (e.g., VG shown in FIG. 3), a plurality of MOSFET devices (e.g., devices in MG1, MG2, MG3 and MG4 shown in FIG. 3), a control circuit (e.g., control apparatus 100 shown in FIG. 3), and a PWM generator.

The bandgap voltage reference is configured to generate a current reference for control a plurality of light emitting diode channels in the light emitting diode system. For each channel, the plurality of MOSFET devices (e.g., devices in MG1, MG2, MG3 and MG4 shown in FIG. 3) is connected in parallel and, through M1 in FIG. 3, coupled between a cathode of the light emitting diode of this channel and ground. The plurality of MOSFET devices is configured to control a current flowing through the light emitting diode of this channel. The control circuit is configured to generate gate drive signals for the plurality of MOSFET devices. The gate drive signals are configured to adjust the current flowing through the light emitting diode based on a predetermined color and a predetermined brightness level of the channel.

A method below is employed to control the brightness and color from a group of red, green and blue light emitting diode channels in the light emitting diode system.

At step 502, in a lighting module comprising a red light emitting diode channel, a green light emitting diode channel and a blue light emitting diode channel, based on a predetermined color, three color digital values are determined and saved in three corresponding color registers.

At step 504, based on a predetermined brightness level, a brightness digital value is determined and saved in a brightness register.

At step 506, the three color digital values are multiplied with the brightness digital value to achieve three PWM signals to control currents flowing through the red light emitting diode channel, the green light emitting diode channel and the blue light emitting diode channel, respectively.

The method further comprises determining a maximum current flowing the red light emitting diode channel, the green light emitting diode channel and the blue light emitting diode channel through selecting a value of a set resistor, adjusting the maximum current flowing the red light emitting diode channel, the green light emitting diode channel and the blue light emitting diode channel through selecting a predetermined set of MOSFET devices, and adjusting a current flowing through one of the red light emitting diode channel, the green light emitting diode channel and the blue light emitting diode channel through a PWM signal, wherein the PWM signal is configured to modulate the maximum current.

The method further comprises applying a bandgap voltage to the set resistor through a first operation amplifier to generate a first reference current, converting the first reference current into a second reference current through a current mirror, converting the second reference current into a first reference voltage through passing the second reference current through an auxiliary transistor operating in a triode region, generating a second reference voltage equal to the first reference voltage through a second operation amplifier, and applying the second reference voltage to plurality of MOSFET devices connected in parallel and coupled between a cathode of the one of the red light emitting diode channel, the green light emitting diode channel and the blue light emitting diode channel, and ground.

A transistor (e.g., M1 in FIG. 3) is connected in series with the one (e.g., D1 in FIG. 3) of the red light emitting diode channel, the green light emitting diode channel and the blue light emitting diode channel. The current mirror comprises a first current mirror transistor (e.g., MP1 in FIG. 3) and a second current mirror transistor (e.g., MP2 in FIG. 3) having gates connected together and further connected to an output of the first operation amplifier (e.g., A1 in FIG. 3). The first current mirror transistor and the set resistor (e.g., $R_{SET}$ in FIG. 3) are connected in series between a bias voltage (e.g., Vb in FIG. 3) and ground. An inverting input of the first operation amplifier is connected to the bandgap voltage (e.g., VG in FIG. 3). A non-inverting input of the first operation amplifier is connected to a common node of the set resistor and the first current mirror transistor. The auxiliary transistor (e.g., M2 in FIG. 3) operating in a triode region is connected in series with the second current mirror transistor between the bias voltage and ground. A gate of the auxiliary transistor operating in a triode region is connected to the bias voltage. A non-inverting input of the second operation amplifier (e.g., A2 in FIG. 3) is connected to a common node of the auxiliary transistor operating in a triode region and the second current mirror transistor through a sample and hold circuit (e.g., S1, S2, S3 and C0 in FIG. 3). An inverting input of the second operation amplifier is connected to a source of the transistor. An output of the second operation amplifier is connected to the gate of the transistor. The plurality of MOSFET devices is from a first MOSFET device group (e.g., MG1 in FIG. 3), a second MOSFET device group (e.g., MG2 in FIG. 3), a third MOSFET device group (e.g., MG3 in FIG. 3) and a fourth MOSFET device group (e.g., MG4 in FIG. 3) connected in parallel between the source of the transistor and ground.

The method further comprises providing a bleed current for compensating a finite amount of time used for charging a gate of the transistor from a low voltage potential to a high voltage potential through applying a first global dimming control signal having 24 control bits to gates of MOSFET devices in the first MOSFET device group.

The method further comprises providing a delay compensation current for compensating a delay caused by a voltage change on a gate of the transistor through applying a second global dimming control signal having 6 control bits to gates of MOSFET devices in the second MOSFET device group.

The method further comprises modulating the maximum current to generate a PWM current flowing through the transistor by applying the PWM signal to gates of MOSFET devices enabled by a third global dimming control signal having 6 control bits.

The method further comprises adjusting a current flowing through the transistor so as to balance currents flowing through different channels through applying a trimming control signal having 6 control bits to gates of MOSFET devices in the fourth MOSFET device group.

The sample and hold circuit (e.g., sample and hold circuit 302 in FIG. 3) comprises a first switch (e.g., S1 in FIG. 3), a second switch (e.g., S2 in FIG. 3), a third switch (e.g., S3 in FIG. 3) and a capacitor (e.g., C0 in FIG. 3). The first switch is connected between the common node of the auxiliary transistor (e.g., M2 in FIG. 3) and the second current mirror transistor (e.g., MP2 in FIG. 3), and the non-inverting input of the second operation amplifier (e.g., A2 in FIG. 3). The second switch and the third switch are connected in series between the common node of the auxiliary transistor and the second current mirror transistor, and the inverting input of the second operation amplifier. The capacitor is connected between the non-inverting input of the second operation amplifier and a common node of the second switch and the third switch.

The method further comprises during a PWM off phase, turning on the first switch and the third switch, and turning off the second switch to store an offset voltage in the capacitor, and during a PWM on phase, turning off the first switch and the third switch, and turning on the second switch to cancel the offset voltage.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:

a bandgap voltage reference configured to generate a current reference for controlling a plurality of light emitting diode channels;

a plurality of MOSFET devices connected in parallel and coupled between a cathode of a light emitting diode channel and ground, wherein the plurality of MOSFET devices is configured to control a current flowing through the light emitting diode channel;

a control circuit configured to generate gate drive signals for the plurality of MOSFET devices, wherein the gate drive signals are configured to adjust the current flowing through the light emitting diode channel based on a predetermined color and a predetermined brightness level of the light emitting diode channel;

a current mirror having inputs coupled to the bandgap voltage reference through a first operation amplifier;

a set resistor coupled to the current mirror;

a current-to-voltage conversion device coupled to an output of the current mirror; and a second operation amplifier coupled between the output of the current mirror and a gate of a transistor connected in series with the light emitting diode channel.

2. The apparatus of claim 1, wherein:

a maximum current flowing through the transistor is determined by the set resistor.

3. The apparatus of claim 1, wherein:

the current mirror comprises a first current mirror transistor and a second current mirror transistor having gates connected together and further connected to an output of the first operation amplifier;

the first current mirror transistor and the set resistor are connected in series between a bias voltage and ground;

an inverting input of the first operation amplifier is connected to the bandgap voltage reference;

a non-inverting input of the first operation amplifier is connected to a common node of the set resistor and the first current mirror transistor;

the current-to-voltage conversion device comprises an auxiliary transistor connected in series with the second current mirror transistor between the bias voltage and ground, and wherein a gate of the auxiliary transistor is connected to the bias voltage;

a non-inverting input of the second operation amplifier is connected to a common node of the auxiliary transistor and the second current mirror transistor through a sample and hold circuit;

an inverting input of the second operation amplifier is connected to a source of the transistor, wherein an output of the second operation amplifier is connected to the gate of the transistor; and the plurality of MOSFET devices is from a first MOSFET device group, a second MOSFET device group, a third MOSFET device group and a fourth MOSFET device group connected in parallel between the source of the transistor and ground.

4. The apparatus of claim 3, wherein:

the sample and hold circuit comprises a first switch, a second switch, a third switch and a capacitor, and wherein:

the first switch is connected between the common node of the auxiliary transistor and the second current mirror transistor, and the non-inverting input of the second operation amplifier;

the second switch and the third switch are connected in series between the common node of the auxiliary transistor and the second current mirror transistor, and the inverting input of the second operation amplifier; and the capacitor is connected between the non-inverting input of the second operation amplifier and a common node of the second switch and the third switch.

5. The apparatus of claim 3, wherein:

the first MOSFET device group is controlled by a first global dimming control signal having 24 control bits, and wherein under the first global dimming control signal, the first MOSFET device group is configured to provide a bleed current for compensating a finite amount of time used for charging a gate of the transistor from a low voltage potential to a high voltage potential.

6. The apparatus of claim 3, wherein:

the first MOSFET device group is controlled by a first global dimming control signal having 24 control bits, and wherein under the first global dimming control signal, the first MOSFET device group is configured to provide a bleed current for keeping the transistor to operate in an on state.

7. The apparatus of claim 3, wherein:

the first MOSFET device group is controlled by a first global dimming control signal having 24 control bits, and wherein under the first global dimming control signal, the first MOSFET device group is configured to provide a bleed current for compensating a duty cycle loss caused by the sample and hold circuit.

8. The apparatus of claim 3, wherein:

the second MOSFET device group is controlled by a second global dimming control signal having 6 control bits, and wherein under the second global dimming control signal, the second MOSFET device group is configured to provide a delay compensation current for compensating a delay caused by a voltage change on a gate of the transistor.

9. The apparatus of claim 3, wherein:

MOSFET devices in the third MOSFET device group are selectively enabled by a third global dimming control signal having 6 control bits, and wherein under the third global dimming control signal, the enabled MOSFET devices in the third MOSFET device group are configured to provide a PWM current flowing through the transistor, and wherein the PWM current is generated based on a PWM signal generated by a PWM generator.

10. The apparatus of claim 3, wherein:

the fourth MOSFET device group is controlled by a trimming control signal having 6 control bits, and wherein under the trimming control signal, the fourth MOSFET device group is configured to adjust a current flowing through the transistor so as to balance currents flowing through different channels.

11. The apparatus of claim 10, wherein:

the trimming control signal is input through a digital interface for adjusting the current flowing through the transistor.

12. A method for controlling brightness and color of a group of red, green and blue light emitting diode channels, comprising:

in a lighting module comprising a red light emitting diode channel, a green light emitting diode channel and a blue light emitting diode channel, based on a predetermined color, determining three color digital values and saving the three color digital values in three corresponding color registers;

based on a predetermined brightness level, determining a brightness digital value and saving the brightness digital value in a brightness register;

multiplying the three color digital values with the brightness digital value to achieve three PWM signals to control currents flowing through the red light emitting diode channel, the green light emitting diode channel and the blue light emitting diode channel, respectively;

determining a maximum current flowing the red light emitting diode channel, the green light emitting diode channel and the blue light emitting diode channel through selecting a value of a set resistor;

adjusting the maximum current flowing the red light emitting diode channel, the green light emitting diode channel and the blue light emitting diode channel through selecting a predetermined set of MOSFET devices; and adjusting a current flowing through one of the red light emitting diode channel, the green light emitting diode channel and the blue light emitting diode channel through a PWM signal, wherein the PWM signal is configured to modulate the maximum current.

13. The method of claim 12, further comprising:

applying a bandgap voltage to the set resistor through a first operation amplifier to generate a first reference current;

converting the first reference current into a second reference current through a current mirror;

converting the second reference current into a first reference voltage through passing the second reference current through an auxiliary transistor operating in a triode region;

generating a second reference voltage equal to the first reference voltage through a second operation amplifier; and applying the second reference voltage to plurality of MOSFET devices connected in parallel and coupled between a cathode of the one of the red light emitting diode channel, the green light emitting diode channel and the blue light emitting diode channel, and ground.

14. The method of claim 13, wherein:

a transistor is connected in series with the one of the red light emitting diode channel, the green light emitting diode channel and the blue light emitting diode channel;

the current mirror comprises a first current mirror transistor and a second current mirror transistor having gates connected together and further connected to an output of the first operation amplifier;

the first current mirror transistor and the set resistor are connected in series between a bias voltage and ground;

an inverting input of the first operation amplifier is connected to the bandgap voltage;

a non-inverting input of the first operation amplifier is connected to a common node of the set resistor and the first current mirror transistor;

the auxiliary transistor operating in a triode region is connected in series with the second current mirror transistor between the bias voltage and ground, and wherein a gate of the auxiliary transistor operating in a triode region is connected to the bias voltage;

a non-inverting input of the second operation amplifier is connected to a common node of the auxiliary transistor operating in a triode region and the second current mirror transistor through a sample and hold circuit;

an inverting input of the second operation amplifier is connected to a source of the transistor, wherein an output of the second operation amplifier is connected to the gate of the transistor; and the plurality of MOSFET devices is from a first MOSFET device group, a second MOSFET device group, a third MOSFET device group and a fourth MOSFET device group connected in parallel between the source of the transistor and ground.

15. The method of claim 14, further comprising:

providing a bleed current for compensating a finite amount of time used for charging a gate of the transistor from a low voltage potential to a high voltage potential through applying a first global dimming control signal having 24 control bits to gates of MOSFET devices in the first MOSFET device group.

16. The method of claim 14, further comprising:

providing a delay compensation current for compensating a delay caused by a voltage change on a gate of the transistor through applying a second global dimming control signal having 6 control bits to gates of MOSFET devices in the second MOSFET device group.

17. The method of claim 14, further comprising:

modulating the maximum current to generate a PWM current flowing through the transistor by applying the PWM signal to gates of MOSFET devices enabled by a third global dimming control signal having 6 control bits.

18. The method of claim 14, further comprising:

adjusting a current flowing through the transistor so as to balance currents flowing through different channels through applying a trimming control signal having 6 control bits to gates of MOSFET devices in the fourth MOSFET device group.

19. The method of claim 14, wherein:

the sample and hold circuit comprises a first switch, a second switch, a third switch and a capacitor, and wherein:

the first switch is connected between the common node of the auxiliary transistor and the second current mirror transistor, and the non-inverting input of the second operation amplifier;

the second switch and the third switch are connected in series between the common node of the auxiliary transistor and the second current mirror transistor, and the inverting input of the second operation amplifier; and the capacitor is connected between the non-inverting input of the second operation amplifier and a common node of the second switch and the third switch.

20. The method of claim 19, further comprising:

during a PWM off phase, turning on the first switch and the third switch, and turning off the second switch to store an offset voltage in the capacitor; and during a PWM on phase, turning off the first switch and the third switch, and turning on the second switch to cancel the offset voltage.

21. A system comprising:

a plurality of lighting modules, each of which comprises a red light emitting diode channel, a green light emitting diode channel and a blue light emitting diode channel; and a light emitting diode control apparatus comprising:

a bandgap voltage reference configured to generate a current reference for controlling the plurality of lighting modules;

a plurality of MOSFET devices connected in parallel and coupled between a cathode of one light emitting diode channel and ground, wherein the plurality of MOSFET devices is configured to control a current flowing through the light emitting diode channel;

a control circuit configured to generate gate drive signals for the plurality of MOSFET devices, wherein the gate drive signals are configured to adjust the current flowing through the light emitting diode channel based on a predetermined color and a predetermined brightness level of the light emitting diode channel;

a current mirror having inputs coupled to the bandgap voltage reference through a first operation amplifier;

a set resistor coupled to the current mirror;

a current-to-voltage conversion device coupled to an output of the current mirror; and a second operation amplifier coupled between the output of the current mirror and a gate of a transistor connected in series with the light emitting diode channel.

22. The system of claim 21, wherein:

the current mirror comprises a first current mirror transistor and a second current mirror transistor having gates connected together and further connected to an output of the first operation amplifier;

the first current mirror transistor and the set resistor are connected in series between a bias voltage and ground;

an inverting input of the first operation amplifier is connected to the bandgap voltage reference;

a non-inverting input of the first operation amplifier is connected to a common node of the set resistor and the first current mirror transistor;

the current-to-voltage conversion device comprises an auxiliary transistor connected in series with the second current mirror transistor between the bias voltage and ground, and wherein a gate of the auxiliary transistor is connected to the bias voltage;

a non-inverting input of the second operation amplifier is connected to a common node of the auxiliary transistor and the second current mirror transistor through a sample and hold circuit;

an inverting input of the second operation amplifier is connected to a source of the transistor, wherein an output of the second operation amplifier is connected to the gate of the transistor; and the plurality of MOSFET devices is from a first MOSFET device group, a second MOSFET device group, a third MOSFET device group and a fourth MOSFET device group connected in parallel between the source of the transistor and ground.

* * * * *